United States Patent [19]

Clinker

[11] Patent Number: 4,631,516
[45] Date of Patent: Dec. 23, 1986

[54] AUXILIARY VEHICLE WARNING SYSTEM

[76] Inventor: Gerald Clinker, 4647 Don Pio, Woodland Hills, Calif. 91364

[21] Appl. No.: 771,249

[22] Filed: Sep. 3, 1985

[51] Int. Cl.$^4$ .................................................. B60Q 1/00
[52] U.S. Cl. ........................................ 340/76; 340/87; 340/110
[58] Field of Search ............... 340/110, 22, 75, 85, 340/87, 94, 104, 107, 66, 752, 762, 332, 815.03, 52 B, 69

[56] References Cited

U.S. PATENT DOCUMENTS

| | | | |
|---|---|---|---|
| 2,974,304 | 3/1961 | Nordlund | 340/22 |
| 3,185,992 | 5/1965 | Smith | 340/22 |
| 3,320,586 | 5/1967 | Wagner | 340/110 |
| 3,501,742 | 3/1970 | Ellison | 340/66 |
| 3,678,457 | 7/1972 | Lev | 340/110 |
| 4,361,828 | 11/1982 | Hose | 340/87 |
| 4,574,269 | 3/1986 | Miller | 340/107 |

Primary Examiner—James L. Rowland
Assistant Examiner—T. Rittmaster
Attorney, Agent, or Firm—John J. Posta, Jr.

[57] ABSTRACT

The auxiliary alarm system can be mounted at eye level on a trunk lid or the like or can be seated on or secured to a vehicle rear window shelf for viewing by a trailing vehicle driver, pedestrians, cyclists, etc. The system includes a housing containing a display window with a visual warning display device, such as a bulb-lighted printed sheet, or an L.E.D. array mounted therein to provide a traveling message and activatable through an electrical circuit connected to the vehicle rear brake light or turn signal circuit. The housing can include a timer and battery to prolong the display, once it is activated by the rear brake light circuit and/or a sensor-discriminator to select one of a number of visual warning displays in response to multiple brake pedal or turn signal circuit activations. An audible alarm can also be connected in the housing. The housing can further include a radio signal or radar signal activatable switch and battery to activate the visual display device upon receipt of a radio or radar signal. The system is compact, inexpensive, easily installed and needs no complicated wiring.

8 Claims, 10 Drawing Figures

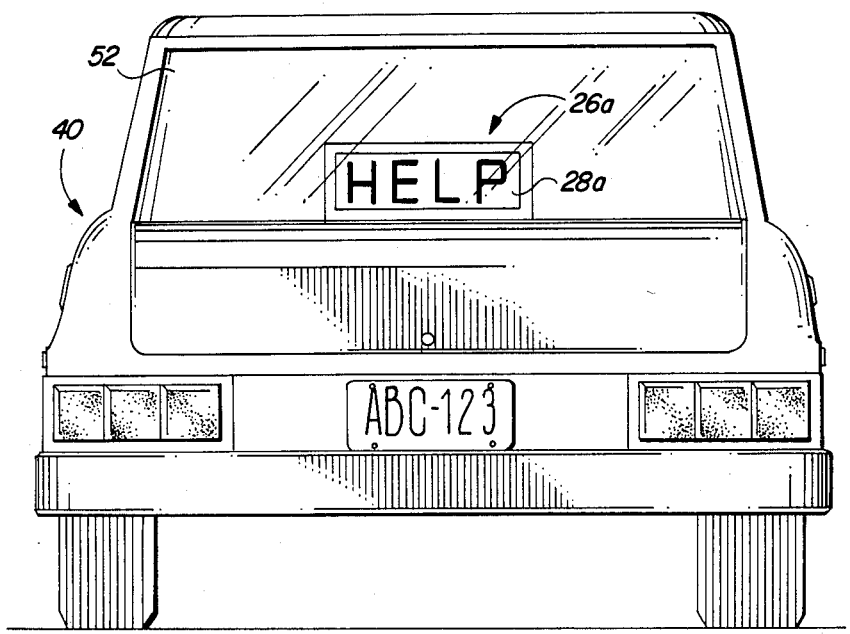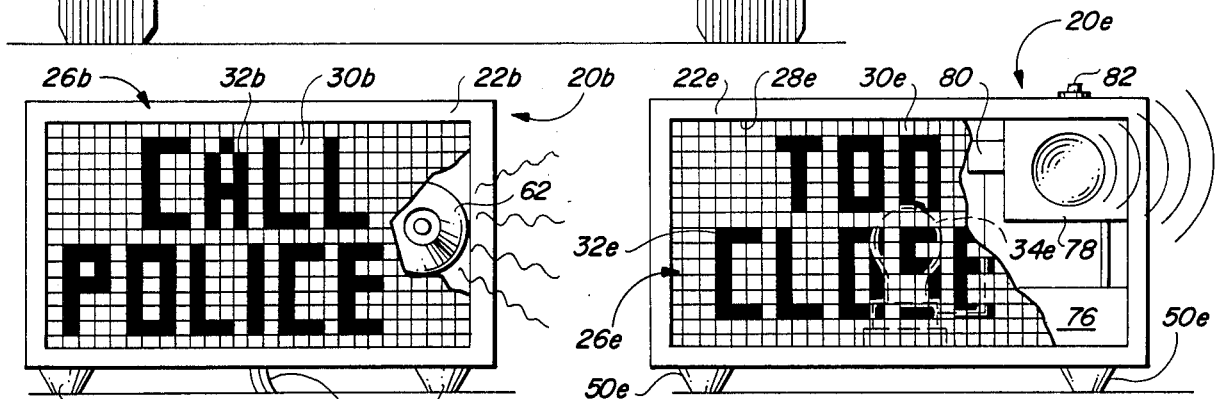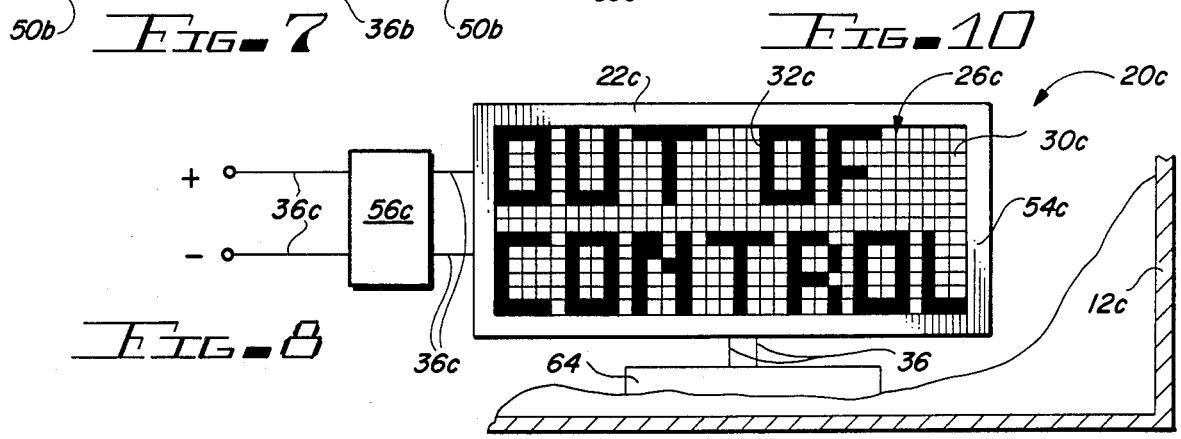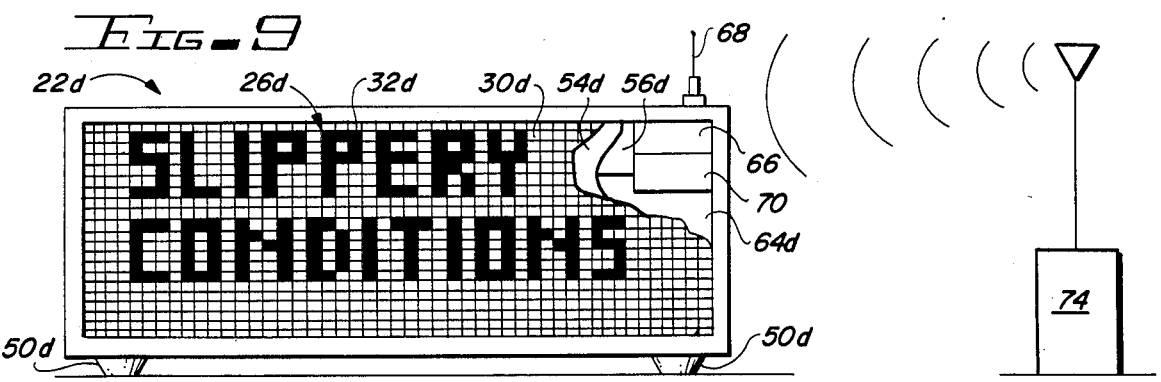

AUXILIARY VEHICLE WARNING SYSTEM

BACKGROUND OF THE INVENTION

1. Field of the Invention

The present invention generally relates to warning devices and, more particularly, to an improved auxiliary vehicle warning system.

2. Prior Art

It has been recently discovered that vehicle brake warning lights are much easier to see at a distance and more eye catching at any range when at about the eye level of the driver of a vehicle trailing behind the braking vehicle. Unfortunately, most vehicles only are presently equipped with permanent, low viewing angle, difficult to see rear brake lights built into the vehicle rear. Accordingly, in order to improve vehicle driving safety there is a need for an improved, inexpensive, durable auxiliary visual vehicle warning device capable of being easily and detachably mounted at about the rear of a vehicle and at a desired eye level. Such device preferably should utilize existing vehicle circuitry and be capable of being installed by any vehicle driver with few or no tools in a minimun amount of time.

In view of the large number of vehicles which become disabled on the road, there is also a substantial need of an improved "disabled condition" signaling system which can be operated from the inside of the vehicle and which will be visable at a considerable distance. Such device preferably also should be capable of transmitting to drivers of other vehicles to pedestrians and other messages, such as warning of a need for police action, in the case of rape, robbery, kidnapping, etc. It would also be desirable if such a warning system could be activated by a remote radio signal to visually display a message regarding a road hazard, and/or could be activated by a radar signal to warn a trailing vehicle of too close an approach.

SUMMARY OF THE INVENTION

All the foregoing needs have been satisfied by the improved auxiliary vehicle brake warning system of the present invention. The system is substantially as set forth in the Abstract. Thus, the system comprises a housing having a hollow interior and an externally viewable display window. The housing is mountable, as by suction cups, bolts or the like to the vehicle rear window shelf, vehicle trunk lid exterior or the like. A visual warning display device is mounted in the housing window and can be electrically activated through a circuit connected to the rear vehicle brake warning light or turn signal circuit. Preferably, the connection between the auxiliary system and brake warning light or turn signal circuit is made in or near the vehicle trunk. Such connection can be permanent or removable, as desired.

When the vehicle brake pedal is pressed, both the main and the auxiliary warning lights are automatically activated (when the auxiliary system is connected to the brake light circuit). The auxiliary visual warning display device may be, for example, a light-transmitting sheet or panel having printed indicia or the like backlighted by an electric bulb, or an L.E.D. array capable of transmitting one or more lighted stationary or moving messages or the like.

If desired, an electrical storage battery and timer can be connected in the housing to prolong the auxiliary warning display beyond the time when the brake pedal is released. Moreover, a sensor-discriminator can be electrically connected in the housing to control the selection of an L.E.D. warning message from a number of messages in response to the number of brake pedal taps or turn signal movements per unit time, or in response to other criteria.

In one embodiment, a radio signal receiver switch is interposed in the housing between a battery and the visual display means. Activation of the switch by receipt of a selected type of radio signal completes the circuit which powers the visual display means to provide a selected warning display.

In another embodiment, the housing includes a radar signal emitter adapted to project a signal against a closely trailing vehicle, a radar signal receiver adapted to receive the reflected signal, and a radar signal-activated switch connected to a battery and the visual display means. When a radar signal is received, the switch is activated, so that the visual display means is powered by the battery to provide a warning message that, for example, the trailing vehicle has made too close an approach to the rear of the vehicle bearing the auxiliary warning system.

Further features of the present invention are set forth in the following detailed description and accompanying drawings.

DRAWINGS

FIG. 4 is a schematic rear elevation of a second preferred embodiment of the improved auxiliary warning system of the present invention shown mounted on the rear window shelf of a vehicle;

FIG. 7 is an enlarged schematic rear elevation, partly broken away, of a third preferred embodiment of the improved auxiliary warning system of the present invention, shown with an audible alarm device therein;

FIG. 8 is an enlarged fragmentary schematic rear elevation, partly broken away, of a fourth preferred embodiment of the improved auxiliary warning system of the present invention;

FIG. 9 is an enlarged schematic rear elevation, partly broken away, of a fifth preferred embodiment of the improved auxiliary warning system of the present invention; and, FIG. 10 is an enlarged schematic rear elevation, partly broken away, of a sixth preferred embodiment of the improved auxiliary warning system of the present invention.

DETAILED DESCRIPTION

FIGS. 1-3

Figure 1:
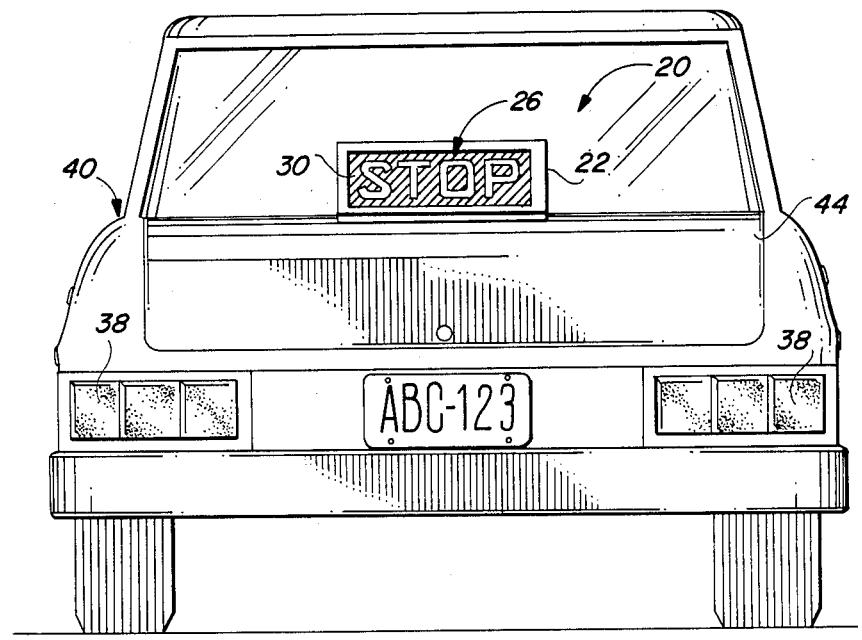
FIG. 1 is a schematic rear elevation of a first preferred embodiment of the improved auxiliary warning system of the present invention, shown mounted on the trunk lid of a vehicle.
Figure 3:
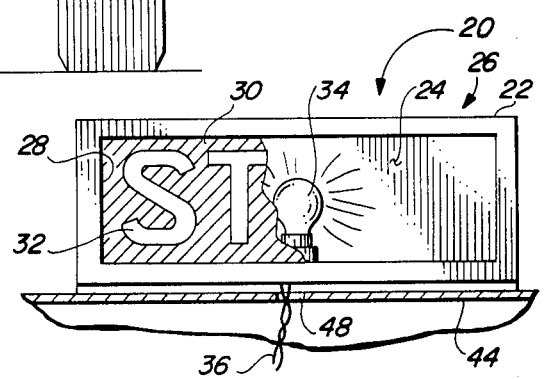
FIG. 3 is an enlarged schematic rear elevation, partly broken away, of the system of FIG. 1.

A first preferred embodiment of the auxiliary alarm system of the invention is shown in FIG. 1. Thus, system 20 is shown which comprises a rectangular housing 22 of metal, plastic, wood, etc., having a hollow interior 24 containing, as per FIG. 3, a visual warning display device 26 mounted in a window 28 of housing 22 for viewing external of housing 22. Device 26 can include a colored, light-transmittable sheet 30 bearing, for example, a printed or cut-out warning message 32 such as STOP. Message 32 is visible only when sheet 30 is back lighted by an electric bulb 34 (FIG. 3) disposed in interior 24 and electrically powered by connection through circuitry 36 (FIGS. 2 and 3) to the vehicle electrical circuit (not shown), specifically that of the rear brake light 38 of vehicle 40. This connection can easily be made inside the trunk 42 of vehicle 40.

When brake light 38 is activated by having the driver of vehicle 40 press the brake pedal, light bulb 34 is also lighted, thus lighting up warning message 32 in window 28 of housing 22.

Figure 2:
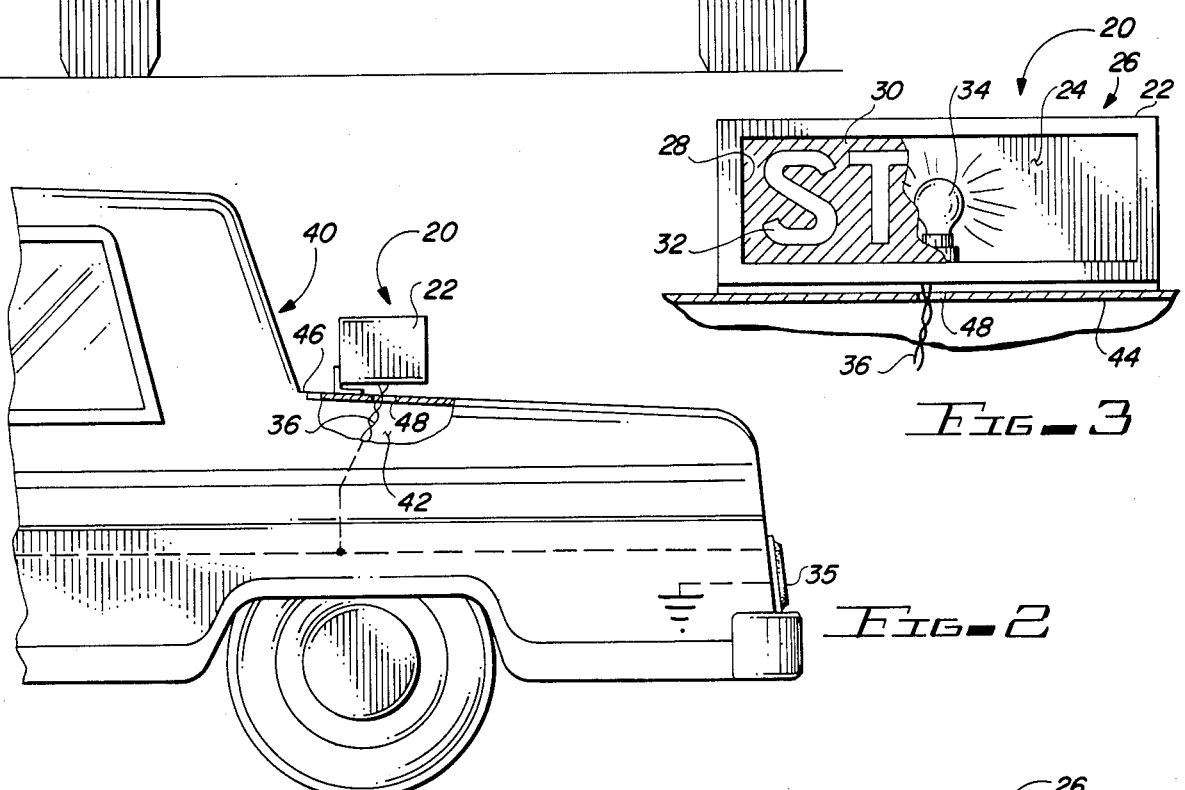
FIG. 2 is a schematic side elevation, partly broken away, of the system of FIG. 1.

Housing 22 is preferably mounted at about eye level on the top of lid 44 of trunk 44, with window 28 facing rearwardly for easy viewing by trailing motorists. An L-shaped mounting bracket 46 (FIG. 2) can, for example, connect housing 22 to the forward end of lid 44 and circuitry 36 can then be passed down through the gap between lid 44 and the adjacent body portion 46 of vehicle 40 or through, as shown in FIG. 2, a separate hole 48 made in lid 44 for series connection to the vehicle rear brake light circuit (not shown). Alternatively, such connection can be made to the vehicle turn signal wiring on one side of the vehicle trunk, so that message 32 is delivered whenever the selected turn signal is activated. Such connection can be easily made permanent or can be easily removed, as needed.

Accordingly, system 20 can be easily installed with a minimum of time and essentially no tools. A clear easily viewable warning message is delivered at eye level for maximum effect. System 20 is inexpensive, durable and effective.

FIGS. 4–6

Figure 5:
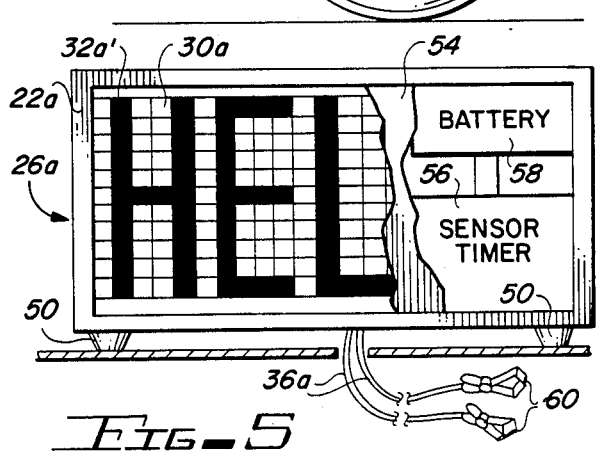
FIG. 5 is an enlarged schematic rear elevation, partly broken away, of the system of FIG. 4.
Figure 6:
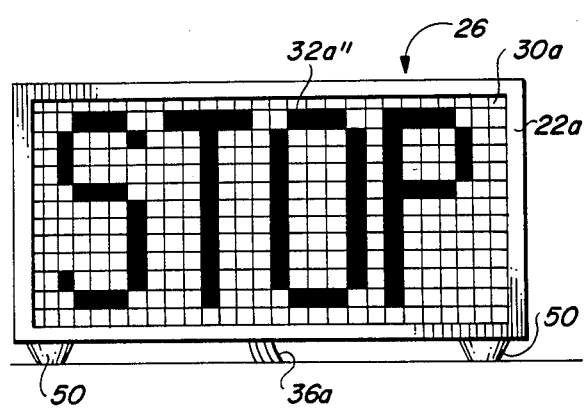
FIG. 6 is an enlarged schematic rear elevation of the system of FIG. 4, with a different message than that of FIG. 5.

A second preferred embodiment of the auxiliary alarm system of the invention is schematically shown in FIGS. 4–6. Components thereof similar to those of FIGS. 1–3 bear the same numerals, but are succeeded by the letter "a". Thus, system 20a is shown which is similar to system 20. Thus, rectangular housing 22a is provided which has a hollow interior 24a, a display device 26a and window 28a, and which is mounted on four short supports 50 (which may be legs or suction cups) so that it can sit on the rear shelf (not shown) adjacent the rear window 52 of vehicle 40a, with window 28a facing rearwardly for easy viewing by trailing motorists, pedestrians, cyclists, etc.

Device 26a comprises a screen 30a having a light-emitting diode (L.E.D.) array 54 capable of projecting a stationary or moving message 32a easily seen through window 28a. Device 26a can be, for example, connected to a conventional sensor-timer 56 in housing 22a, in turn connected to a portable battery 58 in housing 22a and to electric circuitry 36a leading to the rear brake light or rear turn signal electric circuitry of vehicle 40 and releasably securable thereto by alligator clamps.

Sensor 56 includes a multiple message display storage unit (not shown) which allows a number of different messages to be stored therein. Depending on the number of brake taps per unit time or the number of turn signal arm movements per unit time (in turn depending on which electrical circuit system 20a is hooked into), the message storage unit of sensor 56 will cause light-emitting diode array 54 to exhibit the desired message on screen 30a. For example, three quick (within, for example, 2 seconds, brake taps can be used to cause the storage unit of sensor 56 to make array 54 display the HELP message shown in FIG. 5 on screen 30a, while five quick brake taps, for example, (within, for example, 2 seconds) can be used to cause the storage unit of sensor 56 to make array 54 display the STOP message shown on screen 30a in FIG. 6.

The length of duration of message 32a on screen 30a can be determined by operation of the timer switch portion of sensor 56. It will be noted that sensor 56 is electrically connected through the timer switch portion thereof to battery 58 in housing 12a. Therefore, the display message 32a may be sustained beyond the time when the main brake light or the turn signal light is on. Thus, battery 58 can power array 54 for a time determined by the timer switch in sensor 56. It will be understood that the timer switch portion and battery 58 are optional in system 20a. System 20a has the advantages of system 20.

FIG. 7

A third preferred embodiment of the auxiliary warning system of the invention is schematically depicted in FIG. 7. Thus, system 20b is shown. Components thereof similar to those of system 20 or 20a bear the same numerals, but are succeeded by the letter "b".

System 20b is identical to system 20a except that it does not contain a battery similar to battery 58, nor a timer switch. It does contain a sensor 56b having a multiple message storage unit, a light emitting diode array 54b, screen 30b, in window 28b, and wiring 36b in interior 24b of housing 22b. It also contains an audible alarm siren 62 connected in series with array 54b, so that when array 54b is activated, so is siren 62 to call attention to message 32b on screen 30b. System 20b has substantially the advantages of systems 20 and 20a.

FIG. 8

A fourth preferred embodiment of the improved vehicle auxiliary warning system of the invention is schematically shown in FIG. 8. Thus, system 20c is shown. Components thereof similar to those of system 20, 20a or 20b bear the same numerals, but are succeeded by the letter "c". System 20c is in all respects identical to system 20b except that no audible alarm component is present, and except that multiple message storage unit 64 is physically separated from but electrically linked through circuitry 36c to L.E.D. array 54c, screen 30c and sensor 56c. These components are disposed in housing 12c. System 20c has substantially the advantages of systems 20, 20a and 20b.

FIG. 9

A fifth preferred embodiment of the improved vehicle auxiliary warning system of the invention is schematically shown in FIG. 8. Thus, system 20d is shown. Components thereof similar to those of system 20, 20a, 20b or 20c bear the same numerals, but are succeeded by the letter "d".

System 20d is identical to system 20c, except that it also includes a radio receiver 66, with external antenna 68 protruding from housing 12d, a battery 70 powering receiver 66, and a radio-signal activatable switch 72 connected to receiver 66 and to sensor 56d and storage unit 64d. Thus, a selected radio signal received by antenna 68 can activate switch 72 to cause storage unit 64d to make L.E.D. array 54d display a predetermined message 32d on screen 30d. Such message may be, for example, one about the road conditions ahead.

The radio signal may, for example, have been emitted by a radio signal broadcaster 74 positioned on the roadside and operated remotely by the local road authority. Such an arrangement will warn the following motorists of the road danger ahead.

Housing 12d can also include an identical front-facing window 28d and screen 30d to permit the same message to be viewed by the vehicle driver in which housing 12d is installed. System 20d has the other advantages of systems 20, 20a, 20b and 20c.

FIG. 10

A sixth preferred embodiment of the improved vehicle auxiliary alarm system of the invention is schematically shown in FIG. 10. Thus, system 20e is shown. Components thereof similar to those of systems 20, 20a, 20b, 20c or 20d bear the same numerals, but are succeeded by the letter "e".

System 20e is identical to system 20 except that it contains its own power source battery 76, rather than electrical connection to the vehicle brake or turn signal circuit. Battery 76 activates light bulb 34e and the warning message 32e on screen 30e only when a radar signal is received by radar signal emitter-receiver 78 which is of sufficient strength to activate its internal switch 80, causing current to flow from battery 76 to and from bulb 34e.

Housing 12e is adapted to sit on legs 50e and face rearwardly on the shelf in the rear window of a vehicle, so as to direct a radar signal rearwardly. When a trailing vehicle tailgates, the return radar signal will be strong enough and at an angle for proper detection by the receiver portion device 78, causing switch 80 to close and effect illumination of bulb 34e and message 32e, for example, the warning TOO CLOSE! Battery 76 is used to power radar emitter-receiver 78 and has an on-off button switch 82 extending outwardly through housing, so it can be manually activated.

Various other modifications, changes, alterations and additions can be made in the improved vehicle auxiliary alarm system of the present invention, its components and their parameters. All such modifications, changes, alterations and additions as are within the scope of the appended claims form part of the present invention.

What is claimed is:

1. An information display system for vehicles, said system comprising, in combination:

(a) a housing containing a visual display means for providing a plurality of individually selectable messages,
(b) mounting means for removeably securing said display means to a vehicle,
(c) a multiple message display storage unit,
(d) sensor-discriminator means,
(e) pulse generation means capable of generating a plurality of different signals and which is adapted to be selectively activated by the operator of said vehicle said pulse generation means comprising existing electrical equipment for actuating standard vehicle functions, wherein the method of operation of the existing electrical equipment generates pulses,
(f) an electfical power source,
(g) electrical circuit means interconnecting said power source, said pulse generating means, said sensor-discriminator means, said multiple message display storage unit, and said visual display means,
(h) whereby the transmission of a particular signal from said pulse generation means to said sensor discriminator means will cause a predetermined message to be displayed on said visual display means.

2. The information display system of claim 1 wherein,
(a) said pulse generation means is capable of producing a timed sequence of electrical current transmissions and interruptions, and
(b) said sensor-discriminator means is capable of detecting said timed sequence of electrical current transmissions and interruptions.

3. The information display system of claim 2 and further including a timer electrically connected to said display system to allow for a preselected, timed display of a preselected message in said visual display means.

4. The auxiliary warning system of claim 1 wherein said visual display means includes a light-emitting diode array adapted to display visual warning indicia when electrically activated through said ciruitry.

5. The auxiliary warning system of claim 4 wherein said light-emitting diode array is constructed to provide a traveling message thereacross when activated.

6. The information display system of claim 2, further including audible signaling means electrically connected to said electrical circuit means.

7. The information display system of claim 1 wherein said pulse generation means includes at least one of a brake light circuit and turn-signal circuit.

8. The information display system of claim 7 wherein the message displayed on the visual display means is dependent on the number of brake taps performed per unit time or the number or type of signal arm movements performed per unit time.

* * * * *